May 10, 1949. P. G. WHITMORE 2,469,673
VARIABLE-RATE ELECTRIC METER
Filed May 24, 1945
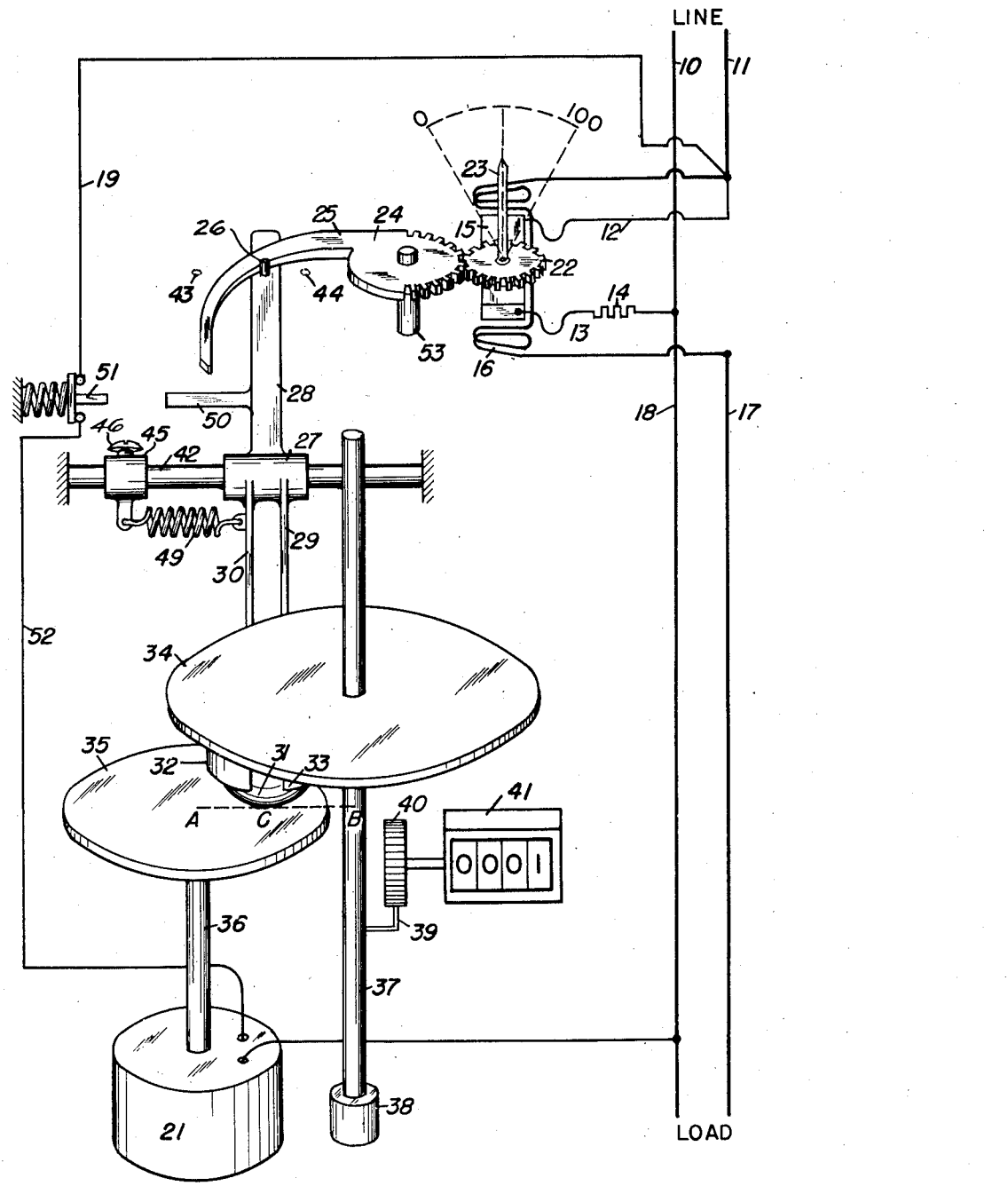
INVENTOR
Paul G. Whitmore Patented May 10, 1949

2,469,673

UNITED STATES PATENT OFFICE 2,469,673

VARIABLE-RATE ELECTRIC METER

Paul G. Whitmore, Pine Bluff, Ark.

Application May 24, 1945, Serial No. 595,561

11 Claims. (Cl. 171—273)

This invention relates generally to electric meters, and more specifically to a type of electric meter adapted for measuring the electric service rendered to a user by an electric supply undertaking.

Among the objects of the present invention may be noted the provision of: (1) an electric meter construction capable of mechanically combining the function of time with an electrical quantity at a variable rate dependent upon the magnitude of the electrical quantity; (2) a meter construction for connection in an electric circuit having means for maintaining a non-registering condition until a predetermined energized condition of an electrical circuit is attained, with means for registering a product of time and an electrical quantity whenever said condition of the circuit is reached; (3) a meter construction in which actuating elements cooperate to mechanically multiply the electrical quantity by a predetermined variable factor which increases as the electrical quantity increases and (4) a simple and effective construction for accomplishing the above-mentioned objectives.

The present invention, while not so limited, is particularily adapted for the measurement of the cost of supplying power and energy from an electric system to a customer, and, if desired, for completely computing mechanically the cost in terms of money in accordance with a predetermined rate schedule. There are currently in operation two methods of measuring the extent of use by a customer of the facilities of a supply system, namely (1) a direct measurement of supplied energy in kwh., regardless of the rate of supply at any specific time and (2) a direct measurement of both maximum power and total energy. The quantities so measured are used as a basis for computation of electric service bills by multiplying such quantities by certain fixed constants to convert the use into terms of money. The watthour meter used generally in method (1) does not provide complete information to accurately determine what use the customer has made of the electrical supply facilities. For example, a customer using 10-500 watt lamps for one hour per month would pay the same amount for service as another customer using 1-10 watt lamp 500 hours per month. The energy in each case is the same, but in the first situation 5.0 kilowatts of power was used compared to 0.01 kilowatt of power in the second situation. The use of method (2), in which both power and energy are measured, much more equitably approximates the cost of supplying the customer, but here again it is not known at what rate all of the kwh. have been used, since only kwh. could establish a demand much higher than that of all of the others. It is an object of the present invention to meter power and energy at a variable rate conforming to the power and energy production equation of the supplying system, based respectively on the investment in plant facilities for the power portion of the rate, and on operating cost for the energy portion.

These and other objects will be apparent from the following description, taken in connection with the accompanying drawing diagrammatically illustrating the invention, and the scope of the invention will be indicated in the appended claims.

In Fig. 1 of the drawing, the meter construction is shown as applied to an electric circuit for metering in a predetermined manner the functions of time and electrical energy. The line conductors 10 and 11 connect the wattmeter elements shown at the numeral 15 to the load conductors 17 and 18 through the series coil 16, the shunt leads 12 and 13, and the usual resistor 14. The deflectable element 22 is geared to a circular portion 24 of the cam member 25, the latter being pivoted for rotary movement about the shaft 53. The arrangement is such that the deflection of both the element 22 and the cam member 25 is determined by the magnitude of the load supplied by the line conductors 10 and 11.

At a lower portion of the structure, a constant speed motor 21, when energized, rotates in a horizontal plane the driving disk 35 at a constant speed through the vertically extending shaft 36. The motor 21 may be of the sub-synchronous type commonly employed for driving electric clocks, and is energized through the conductor 19, the contactor 51, and the motor leads 20 and 52 when the contactor 51 is in closed circuit position.

A driven disk 34 is supported from the bearing 38 and the vertical shaft 37, for rotation in a horizontal plane, and laterally offset and vertically spaced from the disk 35. A ball 31 bridges the space between the driving disk 35 and the driven disk 34, and frictionally engages the disks to cause rotation of the driven disk 35 when the driving disk is rotated and the ball is located between the midpoint and periphery of the driving disk 35. A revolution counter or register 41 is provided for totalizing the revolutions of the disk 34, the counter being driven through passing engagement of the register driving pin 39 with the register wheel 40 in a well known manner.

For guiding the transmission ball 31 along a radial line between the midpoint and periphery of the disk 35, a fixed horizontally extending rod 42 is provided, and the slidable connecting guide member 27, arranged for slidable movement along the rod 42, is provided with the bifurcations 29 and 30, each of the latter terminating between the disks in the cup-shaped portions 32 and 33. The ball 31 is so held within the cups that it may rotate about either a vertical or horizontal axis. The guide member 27 is also provided with a rigidly fixed, outwardly extending rod-like portion 28, and the latter is associated with the cam 25 by the engagement of the vertically extending pin 26, rigidly fixed on the portion 28, with the curved surface of the cam 25. The adjustable stop clamp 45 is fixed in position on the guide rod 42 by means of the set screw 46, and a tension spring 49, fastened at its respective ends to the clamp 45 and the slidable guide member 27, continuously urges the guide member 27 laterally to cause open-circuiting of the contactor 51 by engagement of the laterally extending rod 50 of the guide member 27, and to cause the ball 31 to rest upon the disk 35 at the maximum inward position when the guide member is not moved or held between the inward position and periphery of the disk 35 through the agency of the wattmeter elements 15. In the embodiment of the invention illustrated, when the pin 26 is at the position indicated by the numeral 43, there is no load on the wattmeter elements, the ball 31 is at the midpoint of the disk 35, the contactor 51 is in open circuit position, and the disk 34 is stationary. When the pin 26 is at the position indicated by the numeral 44, the wattmeter elements are fully loaded, the ball 31 is at the maximum outward position on the disk 35, the contactor 51 is in closed circuit position, and the disk 34 is rotating at maximum speed.

As illustrated, an electrical load is causing the deflection of the ball 31 from the zero position to cause rotation of the disk 35, through frictional engagement with the driving and driven disks. It is noted that the driven disk is actuated only through frictional drive, and it is desirable that the driving and driven disk be formed of aluminum, and the ball of some rubber-like material.

The mechanical relationship of the coupling between the disks is explained as follows:

Let $x$ represent the fractional distance measured outwardly from the zero position at which the ball 31 contacts the disk 35 between the respective midpoints of the disks.

That is, let $x$ equal AC/AB

Also, yet $y$ represent $$\frac{\text{speed of disk 35}}{\text{speed of disk 34}}$$

Then $y$ equals $$\frac{x}{1-x}$$

The following table illustrates some results which may be obtained from the variable-ratio coupling shown.

| $x$ | R. P. M. of disk 35 | R. P. M. of disk 34 | ratio |
|---|---|---|---|
| 0 | 100 | 0 | 0 |
| 0.25 | 100 | 33⅓ | ⅓ |
| 0.50 | 100 | 100 | 1 |
| 0.75 | 100 | 300 | 3 |
| 1.00 | 100 | infinite | infinite |

From the foregoing, it will appear that a value of $x$ greater than 0.75 may be impractical for mechanical reasons, but that ample range of speeds of the disk 34 is available for practical purposes.

For direct integration of watthours, assume the pointer 23 moves over an evenly divided scale between 0 and 100. The curvature of the cam member 25 which contacts the pin 26 may be calculated from (1) the known speed of the disk 35, called S; the register constant, or number of revolutions of the disk 34 to indicate one watthour on the counter, called K; and the full scale of the measuring device 15, called F.

At no-load, the spring 49 holds the ball 31 at the midpoint of the disk 35, and no rotation of the disk 34 occurs.

At, for example, 10% load, the watthours in one hour for this condition are 0.1 F. The number of revolutions of the disk 34 to cause registration of 0.1 watthour is the product of 0.1 F and K, the register constant.

Therefore $y$ equals $$\frac{S}{0.FK}$$

but also $y$ equals $$\frac{x}{1-x}$$

Solving these simultaneous equations, and substituting numerical values of S, F, and K, will yield the value of $x$ for the assumed condition.

The corresponding point on the curve of the cam 25 is located on a radian through the midpoint of the shaft 53, 10% displaced from the zero position, and radially away from the midpoint an amount such that the distance from midpoint to periphery of the ball is equal to the value of $x$ as determined. Other points corresponding to other loads may be similarly determined.

The meter construction of my invention herein is not limited to direct integration, and under certain conditions it is desirable to multiply the integration by a variable factor, and to register such a multiplication in terms, for example, of money. Conditions may be such, for example, that an applicable rate may be $3.00 per month including all energy desired when the rate of use is less than a maximum of 500 watts; a surcharge of $0.03 for each kilowatt-hour used at a rate exceeding 500 watts; and an additional surcharge of $0.04 for each kilowatt-hour used at a rate exceeding 1000 watts, with either straight line or curved line variations between respectively 500 and 1000 watts, and 1000 and 2000 watts. To accomplish such totalizations requires only that the speed of the disk 34 be known to effect the desired registration, and the curvature of the cam be determined by the method above described.

It may be noted that the contactor 51, together with the arrangement for disconnecting the motor 21, is not essential to the proper operation of my meter, but is very desirable to avoid unnecessary operation of the motor. It may also be noted that, if desired, the contact operator 50 may be constructed to cause no registration of the meter at numerous values of load.

It is intended that the description of the embodiment of the invention here presented will be regarded as illustrative, rather than limiting.

I claim, as my invention:

1. A variable-rate electric meter comprising a driving disk, means rotating said driving disk at constant speed, a rotatable driven disk mounted in spaced parallel relationship to said driving disk, reciprocably movable rotatable means connecting said disks, means guiding said rotatable means along a radius of said driving disk for causing rotation of said driven disk when said rotatable means is positioned between the midpoint and the periphery of said driving disk, elements constituting an electrical measuring device embodying a deflectable element, means including an eccentric cam controlled by said deflectable element for establishing the position of said rotatable means, and means for counting the revolutions of said driven disk.

2. A variable-rate electric meter comprising a driving disk, means for rotating said driving disk at constant speed, a rotatable driven disk mounted in spaced parallel relationship to said driving disk, reciprocably movable means connecting said disks in frictional engagement for causing rotation of said driven disk, means holding said movable means along a predetermined path over a radius of said driving disk, a pivoted eccentric cam, electro-responsive means embodying a movable element operatively connected through said cam to said movable means and cooperating therewith to establish the latter in a predetermined position in response to a predetermined movement of said movable element, and means for visibly indicating the revolutions of said driven disk.

3. A variable-rate electric meter comprising a driving disk, means rotating said driving disk at a constant speed, a rotatable driven disk mounted in spaced parallel relationship to said driving disk, rotatable means spanning the space between said disks and in frictional engagement therewith, means guiding said rotatable means along a radius of said driving disk for causing rotation of said driven disk at a speed dependent upon the position of said rotatable means along said radius, a pivoted eccentric cam, electro-responsive means embodying a movable element operatively connected through said cam to said rotatable means and cooperating therewith to establish the latter in a predetermined position in response to a predetermined movement of said movable element, and means for counting the revolutions of said driven disk.

4. A variable-rate electric meter comprising a driving disk, means rotating said driving disk at a constant speed, a laterally spaced rotatable driven disk mounted in vertical spaced parallel relationship to said driving disk, laterally movable rotatable means spanning the space between said disks in frictional engagement therewith, means guiding the movement of said rotatable means radially between said disks for causing rotation of said driven disk at a speed dependent upon the position of said rotatable means, a pivoted eccentric cam, electro-responsive means embodying a movable element operatively connected through said cam to said rotatable means and cooperating therewith to establish the latter in a predetermined position in response to a predetermined movement of said movable element, and means for counting the revolutions of said driven disk.

5. A variable-rate electric meter comprising a driving disk, means rotating said driving disk in a horizontal plane at a constant speed, a laterally spaced driven disk rotatable in a plane vertically spaced from and parallel to the plane of said driving disk, a ball spanning said disks in frictional engagement therewith, means guiding the lateral movement of said ball radially between said disks for causing said driven disk to rotate at a speed dependent upon the radial position, electro-responsive means embodying a deflectable element, a pivoted eccentric cam, means operatively connecting said deflectable element through said cam to said ball and cooperating therewith to move the latter to a predetermined position in response to a predetermined movement of said deflectable element, and means for counting the revolutions of said driven disk.

6. A variable-rate electric meter comprising a driving disk, means rotating said driving disk in a horizontal plane at a constant speed, a laterally spaced driven disk rotatable in a plane vertically spaced from and parallel to the plane of said driving disk, a ball spanning said disks in frictional engagement therewith, means guiding the lateral movement of said ball radially between said disks from the midpoint to the periphery of the driving disk for causing said driven disk to rotate at a speed dependent upon the radial position of said ball, electro-responsive means embodying a deflectable element, a pivoted eccentric cam, means operatively connecting said deflectable element to said ball through said cam and cooperating therewith to move the latter to a predetermined position between said midpoint and said periphery in response to a predetermined movement of said deflectable element, resilient means urging said ball to the midpoint of said driving disk, and means for counting the revolutions of said driven disk.

7. A variable-rate electric meter comprising a driving disk, means rotating said driving disk in a horizontal plane at a constant speed, a laterally spaced driven disk rotatable in a plane vertically spaced from and parallel to the plane of said driving disk, a ball spanning said disks in frictional engagement therewith, means guiding the lateral movement of said ball radially between said disks from the midpoint to the periphery of the driving disk for causing said driven disk to rotate at a speed dependent upon the radial position of said ball, electro-responsive means embodying a deflectable element, eccentric cam means responsive to the deflection of said deflectable element for urging said ball toward the periphery of said driving disk, resilient means opposing the movement of said ball toward the periphery of said driving disk, and means for counting the revolutions of said driving disk.

8. A variable-rate meter adapted for connection with an electric circuit, said meter comprising a driving disk, a motor arranged to rotate said driving disk at a constant speed, a rotatable driven disk mounted in lateral and vertical spaced relationship to said driving disk, a rollable ball spanning said disks in frictional engagement therewith, means guiding the lateral movement of said ball radially between the midpoint and the periphery of said driving disk, the arrangement being such that said ball spins about a vertical axis without causing movement of said driven disk when at said midpoint and about a horizontal axis for causing rotary movement of said driven disk when positioned between said midpoint and said periphery, resilient means urging said ball toward said midpoint, means responsive to a condition of said electric circuit for establishing the radial position of said ball, means for de-energizing said motor when said ball is at a predetermined position, and means for totalizing the revolutions of said driven disk.

9. A variable-rate meter adapted for connection with an electric circuit, comprising a constant speed motor, a driving disk driven thereby, a rotatable driven disk spaced vertically and laterally with respect to said driving disk, a ball mounted between said disks in frictional engagement therewith for rotation in both horizontal and vertical planes, a slidable connecting member holding said ball along a path between an inward position and an outward position along the surface of said driving disk to cause the speed of said driven disk to vary when said ball is moved along said path, elements comprising a wattmeter embodying a deflectable element connected in said circuit, eccentric cam means connecting said deflectable element to said slidable connecting member for urging said ball to differing predetermined positions in its path in accordance with respective predetermined deflections of said deflectable element, resilient means connected to said slidable member and urging said ball to said inward position, and a counter associated with said driven disk for totalizing the revolutions thereof.

10. A variable-rate electric meter adapted for connection with an electric circuit, comprising a driving disk, means driving said driving disk at a constant speed, a driven disk adapted to be driven by said driving disk, electrically operated means responsive to the occurrence of a change in a condition of said circuit for disproportionately changing the speed of said driven disk, and means for counting the revolutions of said driven disk.

11. A variable-rate meter adapted for connection with an electric circuit, comprising a driving disk, a constant speed motor for driving said driving disk at a constant speed of rotation, a driven disk mounted in vertical and lateral spaced relationship so that a portion of one of said disks extends over a portion of the other, a ball mechanically connecting said disks to cause rotation of said driven disk when said ball is positioned between the midpoint and periphery of said driving disk and said driving disk is rotated and to be without effect on said driven disk when said ball is positioned at the midpoint of said driving disk and said driving disk is rotated, electrically operated means for moving said ball outwardly from said midpoint in response to an energized condition of said circuit, resilient means for returning said ball to said midpoint when said circuit is deenergized, and means for registering the revolutions of said driven disk.

PAUL G. WHITMORE.

REFERENCES CITED

The following references are of record in the file of this patent:

UNITED STATES PATENTS

| Number | Name | Date |
| --- | --- | --- |
| 494,225 | Rennerfelt | Mar. 28, 1893 |
| 1,156,412 | Lincoln | Oct. 12, 1915 |
| 2,017,703 | Pratt | Oct. 15, 1935 |
| 2,377,898 | Myers | June 12, 1945 |